(12) United States Patent
Semple et al.

(10) Patent No.: US 11,795,937 B2
(45) Date of Patent: Oct. 24, 2023

(54) TORQUE MONITORING OF ELECTRICAL SUBMERSIBLE PUMP ASSEMBLY

(71) Applicant: Baker Hughes Oilfield Operations LLC, Houston, TX (US)

(72) Inventors: Ryan Semple, Owasso, OK (US); David Tanner, Broken Arrow, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 380 days.

(21) Appl. No.: 17/143,494

(22) Filed: Jan. 7, 2021

(65) Prior Publication Data

US 2021/0207596 A1    Jul. 8, 2021

Related U.S. Application Data

(60) Provisional application No. 62/958,529, filed on Jan. 8, 2020.

(51) Int. Cl.
*E21B 43/12* (2006.01)
*E21B 47/12* (2012.01)
(Continued)

(52) U.S. Cl.
CPC ............ *F04B 49/06* (2013.01); *E21B 43/128* (2013.01); *E21B 47/12* (2013.01); *E21B 47/138* (2020.05);
(Continued)

(58) Field of Classification Search
CPC ...... E21B 43/128; E21B 47/12; E21B 47/138; E21B 43/13; E21B 47/14
See application file for complete search history.

(56) References Cited

U.S. PATENT DOCUMENTS 6,798,338 B1 * 9/2004 Layton .................... F04D 9/002
340/854.6
7,658,227 B2    2/2010 Fox et al.
(Continued)

FOREIGN PATENT DOCUMENTS

EP        1735521 B1    12/2009
WO    2005100733 A1    10/2005
(Continued)

OTHER PUBLICATIONS

International Search Report and Written Opinion of PCT Application Serial No. PCT/US2021/012601 dated Apr. 6, 2021: pp. 1-14.

*Primary Examiner* — Shane Bomar
(74) *Attorney, Agent, or Firm* — BRACEWELL LLP; Keith R. Derrington

(57) ABSTRACT

An electrical submersible well pump assembly has a SAW (surface acoustic wave) sensor on a motor shaft. A SAW electronic circuit mounts to the motor housing. The SAW electronic circuit has an antenna closely spaced to the SAW sensor for monitoring torque on the motor shaft. A controller at an upper end of the well supplies power to the motor. A motor gauge unit mounted to a lower end of the motor transmits signals to the controller. A signal line extends from the SAW electronic circuit to the motor gauge unit for transmitting signals from the SAW electronic circuit to the motor gauge unit, and from the motor gauge unit to the controller.

19 Claims, 5 Drawing Sheets

(51) Int. Cl.

| | | |
|---|---|---|
| *F04B 49/06* | (2006.01) | |
| *F04B 47/06* | (2006.01) | |
| *F04B 53/18* | (2006.01) | |
| *H02K 5/132* | (2006.01) | |
| *H02K 11/24* | (2016.01) | |
| *H02K 11/30* | (2016.01) | |
| *G01L 3/02* | (2006.01) | |
| *H02K 5/124* | (2006.01) | |

(52) U.S. Cl.
CPC .............. *F04B 47/06* (2013.01); *F04B 53/18* (2013.01); *G01L 3/02* (2013.01); *H02K 5/124* (2013.01); *H02K 5/132* (2013.01); *H02K 11/24* (2016.01); *H02K 11/30* (2016.01); *F04B 2201/1202* (2013.01)

(56) References Cited

U.S. PATENT DOCUMENTS

| | | | |
|---|---|---|---|
| 7,672,262 B2 | 3/2010 | McCoy et al. | |
| 7,798,215 B2 | 9/2010 | Euthen et al. | |
| 8,051,912 B2 | 11/2011 | Layton | |
| 8,138,262 B2 | 3/2012 | Perrine | |
| 8,319,656 B2 | 11/2012 | Clark et al. | |
| 8,328,529 B2 | 12/2012 | Thompson et al. | |
| 8,400,093 B2* | 3/2013 | Knox | E21B 47/008 318/257 |
| 8,537,364 B2 | 9/2013 | Forsberg et al. | |
| 2007/0030762 A1 | 2/2007 | Huang et al. | |
| 2007/0215343 A1* | 9/2007 | McDonald | H02K 49/102 166/105 |
| 2007/0251729 A1* | 11/2007 | Sand | E21B 47/12 175/107 |
| 2013/0272898 A1* | 10/2013 | Toh | F04D 13/10 417/44.1 |
| 2018/0051555 A1 | 2/2018 | Marvel et al. | |
| 2019/0249548 A1* | 8/2019 | Zhang | H04L 67/12 |
| 2021/0293140 A1* | 9/2021 | Brown | G01N 33/2823 |
| 2022/0275687 A1* | 9/2022 | Xu | G06T 7/0004 |

FOREIGN PATENT DOCUMENTS

| | | |
|---|---|---|
| WO | 2011127305 A1 | 10/2011 |
| WO | 2018005432 A1 | 1/2018 |

* cited by examiner

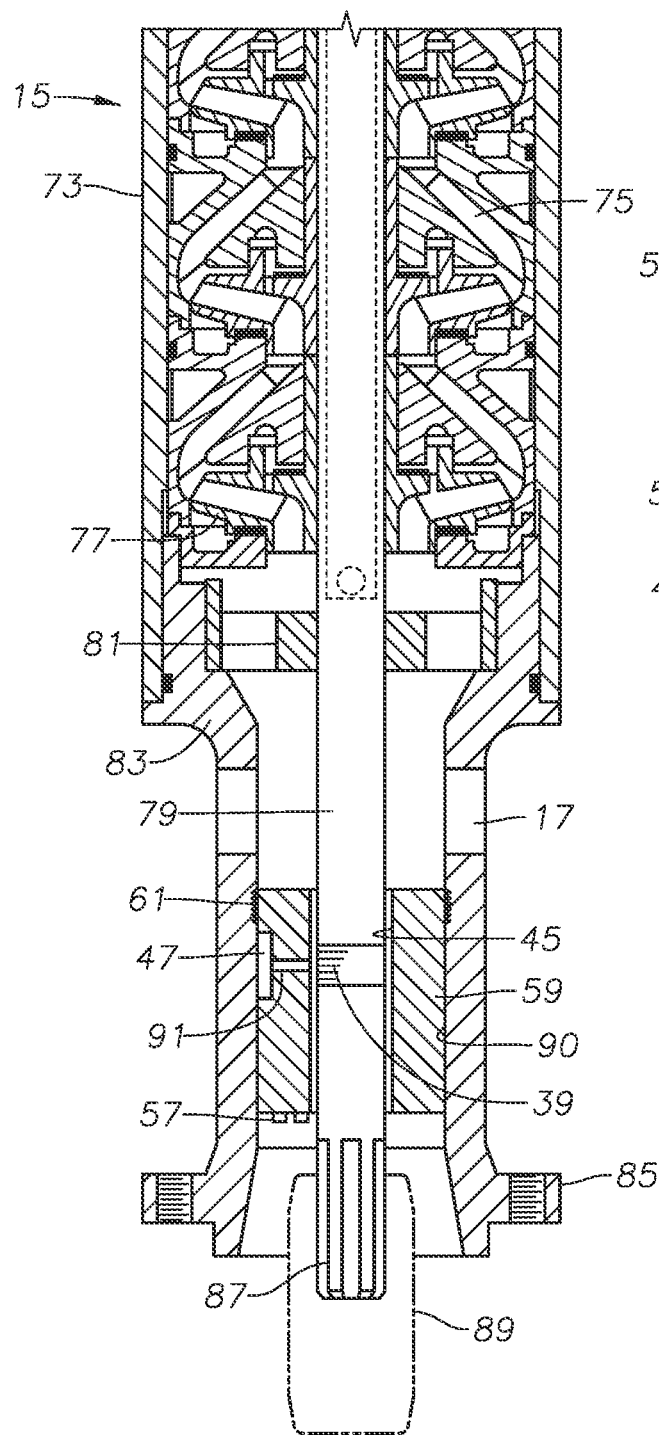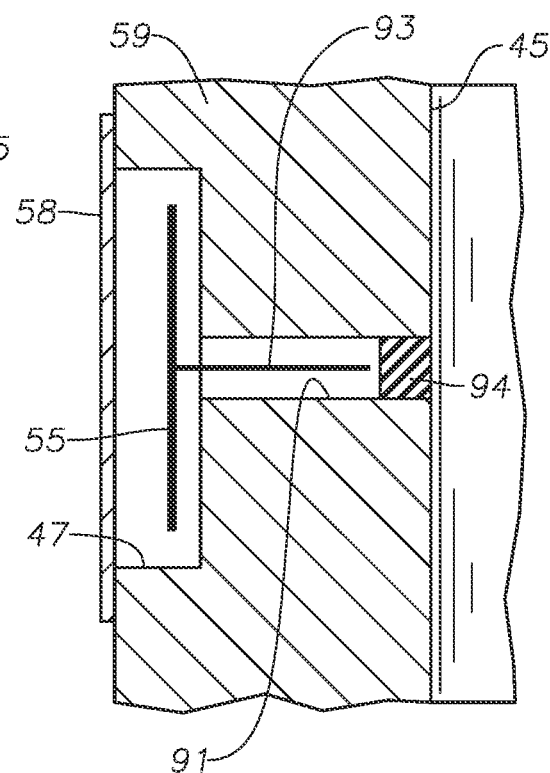
FIG. 9
FIG. 8

TORQUE MONITORING OF ELECTRICAL SUBMERSIBLE PUMP ASSEMBLY

CROSS-REFERENCE TO RELATED APPLICATION

This application claims the priority of provisional application Ser. No. 62/958,529, filed Jan. 8, 2020.

FIELD OF THE DISCLOSURE

This disclosure relates in general to electrical submersible well pumps (ESP), particularly to a technique for monitoring torque on the shafts of the modules using surface acoustic wave (SAW) sensors.

BACKGROUND

Electrical submersible well pumps are often used to pump liquids from hydrocarbon producing wells. A typical ESP includes a pump driven by an electrical motor. The pump may be a centrifugal pump having a large number of stages, each having an impeller and a diffuser. The motor can be quite powerful and lengthy, 30 feet or more with hundreds of horsepower. The ESP module drive shafts undergo substantial torque and may twist significantly, having a shaft windup of three to four rotations from the top to the bottom. The torque can increase and decrease during operation for a variety of reasons, such as well fluid laden with sand, or gas slugs flows up through the pump. Bearing wear can also increase the torque. Normally, the torque on the motor drive shaft may be indirectly measured by monitoring the current flow to the motor.

One type of sensor for a variety of uses is a surface acoustic wave (SAW) sensor. A SAW sensor consists of a piezoelectric substrate with an input interdigitated transducer (IDT) on one side of the substrate and an output IDT on the other side. A SAW sensor relies on the modulation of surface acoustic waves. An electronic circuit provides an input electrical signal to the SAW sensor, which is influenced by physical phenomena, such as torque. The sensor creates a mechanical wave, and the output IDT transduces the mechanical wave back into an output electric signal. Any changes made to the mechanical wave, such as by torque, will be reflected in the output electric signal, which is indicative of the phenomena being measured. Although not known to be used with ESPs, SAW sensors have been employed for measuring torque on shafts.

SUMMARY

An electrical submersible pump assembly for pumping well fluid from a well has a pump having a pump housing containing a plurality of pump stages through which a pump shaft extends. A motor having a motor housing contains a motor shaft. A seal section having a seal housing contains a seal shaft that is coupled to and between the pump shaft and the motor shaft. A motor shaft SAW (surface acoustic wave) sensor mounts to the motor shaft. A motor shaft SAW electronic circuit mounts to the motor housing. The motor shaft SAW electronic circuit has a motor shaft SAW antenna closely spaced to the motor shaft SAW sensor for monitoring torque on the motor shaft. A controller mounted at an upper end of the well supplies power to the motor. A motor gauge unit mounted to a lower end of the motor transmits signals to the controller. A signal line extends from the motor shaft SAW electronic circuit to the motor gauge unit for transmitting signals from the SAW electronic circuit to the motor gauge unit, and from the motor gauge unit to the controller.

In the embodiments shown, the motor shaft SAW sensor is adjacent an upper end of the motor shaft. In some of the embodiments, a pump SAW sensor is on the pump shaft. A pump SAW electronic circuit on the pump housing has a pump shaft SAW antenna closely spaced to the pump SAW sensor. The pump SAW electronic circuit is in electrical communication with the motor gauge unit for transmitting signals from the pump SAW electronic circuit to the controller.

A seal section SAW sensor may be located on the seal shaft. A seal section SAW electronic circuit on the seal section housing has a seal shaft antenna closely spaced to the seal section SAW sensor. The seal section SAW electronic circuit is in electrical communication with the motor gauge unit for transmitting signals from the seal section SAW electronic circuit to the controller.

The motor may be filled with a dielectric lubricant, and signals between the motor shaft SAW sensor and the motor shaft SAW electronic circuit pass through the dielectric lubricant. Signals between the pump shaft SAW sensor and the pump shaft SAW electronic circuit pass through well fluid being pumped by the pump.

In some embodiments, a pump tubular body may be secured within the pump housing. The pump SAW electronics circuit mounts on the tubular body. More specifically, a pocket may be formed in an outer side wall of the pump tubular body that contains the pump SAW electronics circuit. An antenna passage extends from the pocket to an inner side wall of the pump tubular body. The pump shaft SAW antenna is located in the antenna passage.

In some embodiments, a motor tubular body forms a part of the motor housing. The motor SAW electronics circuit mounts in a pocket formed in an outer side wall of the motor tubular body. An antenna passage extends from the pocket to an inner side wall of the motor tubular body. The motor shaft SAW antenna mounts in the antenna passage adjacent the inner side wall of the motor tubular body and electrically connects with the motor SAW electronics circuit.

The motor housing may comprise a cylindrical outer sleeve having a motor head at an upper end of the outer sleeve. The motor tubular body may have a lower end secured to the motor head and an upper end secured to the seal section. Alternately, the motor tubular body may comprise the motor head.

BRIEF DESCRIPTION OF THE DRAWINGS

FIG. 8 is a sectional and partly schematic view of the SAW tubular body of FIG. 4 mounted inside the base of the pump of FIG. 1.

FIG. 9 is an enlarged schematic and sectional view of a portion of the tubular body of FIG. 8.

DETAILED DESCRIPTION OF THE DISCLOSURE

Figure 1A:
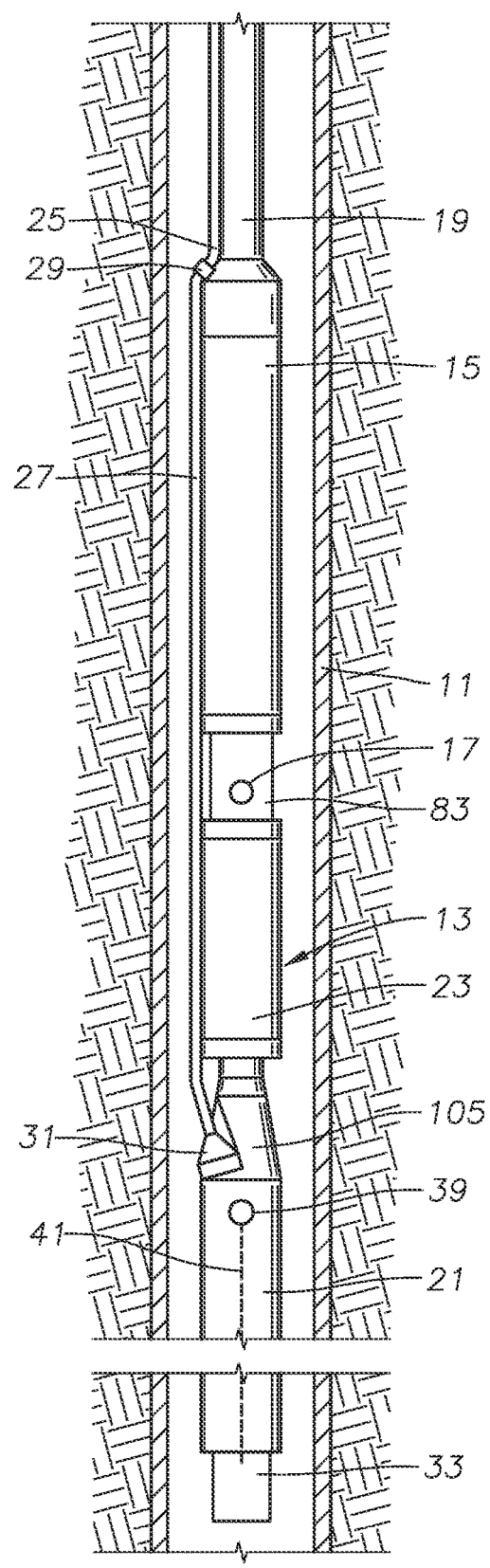
FIGS. 1A and 1B comprise a schematic side view of an ESP (electrical submersible pump) installed in a well and having a SAW sensor in accordance with this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper" and "lower" and the like are used only for convenience as the well pump may operate in positions other than vertical, including in horizontal sections of a well.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1A, a well 11 with casing has an ESP (electrical well pump assembly) 13 for hydrocarbon well fluid pumping operations. ESP 13 includes a number of modules including a rotary pump 15. Pump 15 may be a centrifugal pump having a large number of stages, each of the stages having an impeller and a diffuser. Pump 15 may be suspended in the well on a string of production tubing 19. Pump 15 has a base with an intake 17 and discharges into production tubing 19 in this example. Alternately, ESP 13 could be supported on a string of coiled tubing. If so, pump 15 would discharge into an annulus of a production conduit surrounding the coiled tubing.

ESP 13 also includes an electrical motor 21 for driving pump 15. Motor 21 connects to pump 15 via a seal section 23. Motor 21 is filled with a dielectric lubricant. A pressure equalizer, such as a elastomeric bag, within seal section 23 reduces a pressure differential between lubricant in motor 21 and the exterior well fluid. Alternately, the pressure equalizer could be mounted to a lower end of motor 21. Motor 21 and pump 15 could each comprise more than one unit mounted in tandem. ESP 13 could have other modules, such as a gas separator mounted to the base of pump 15. If so, intake 17 would be in the gas separator.

A power cable 25 extends alongside production tubing 19. Power cable 25 connects to a motor lead 27 by a splice 29. Motor lead 27, which may be considered to be a part of power cable 25, extends along the side of ESP 13 and has an electrical connector 31 on its lower end that connects to an upper end of motor 21. If ESP 13 is supported on coiled tubing, power cable 25 would be located inside of the coiled tubing, and motor 21 would typically be mounted above pump 15.

In this embodiment, a motor gauge unit 33 connects to the lower end of motor 21. Motor gauge unit 33 may have gauges for measuring the temperature and pressure of the motor lubricant. Motor gauge unit 33 is powered by and transmits signals (FIG. 1B) to a controller 37 adjacent a wellhead 35 at the upper end of the well. The signals from motor gauge unit 33 may be superimposed on the windings in motor 21 and power cable 25. Alternately, the signals from motor gauge unit 33 and the power to motor gauge unit 33 could pass through an instrument line electrically connected with controller 37. Controller 37 provides a readout of signals sent by motor gauge unit 33. Controller 37 may also include a variable speed drive that varies the frequency of the three phase power being supplied to motor 21 to vary the speed of motor 21.

ESP 13 has at least one SAW (surface acoustic wave) sensor 39 for monitoring torque on the drive shaft assembly that drives pump 15. In FIG. 1, SAW sensor 39 is mounted near an upper end of the drive shaft of motor 21. Another SAW sensor 39 may be mounted near the bottom of the motor shaft, as illustrated in FIG. 2. A SAW electronics circuit (not shown in FIG. 1) is mounted to motor 21 for each SAW sensor 39 to provide input signals to SAW sensor 39, receive output signals from SAW sensor 39, and transmit the output signals to controller 37. In this example, a signal line 41 powers the SAW electronics circuit and transmits output signals to motor gauge unit 33. Signal line 41 may extend internally within motor 21 to motor gauge unit 33. Motor gauge unit 33 transmits that information to controller 37 in the same manner as it transmits the motor lubricant pressure and temperature information. That is, it either transmits the information through the motor windings and up motor lead 27 and power cable 25; or it may transmit the information through a separate instrument line.

The parameters detected by SAW sensor 39 include the torque and relative twist on the motor shaft. Those parameters provide dynamic information about how ESP 13 is operating and allow controller 37 to make adjustments. For example, the information concerning shaft twist will include torsional oscillations to enable controller 37 to make optimizations. The parameters monitored can be indicative of horsepower generated and motor efficiency. If motor 21 is a permanent magnet motor, twist in the motor shaft can complicate motor control, enabling controller 37 to make adjustments. Low frequency (DC) heating of motor 21 can be better controlled by monitoring for an increase in torque on the motor shaft. An increase in torque could be indicative of an increase in friction of the motor bearings. Information about the torque and relative twist of the motor shaft enables controller 37 to adapt smoother starting and stopping ramp profiles.

As illustrated in FIG. 2, SAW sensors 39, along with their SAW electronic circuits could also be mounted to the upper and lower ends of the shafts within seal section 23 and pump 15. The signal wires from each SAW sensor 39 are daisy chained together for transmitting separate signals to motor gauge unit 33. Encoding the SAW sensors 39 of pump 15, seal section 23, and motor 21 will determine the relative twist in each of the shafts. Controller 37 will be cognizant of where each SAW sensor 39 is located. The signal wires from the SAW sensors 39 could pass internally through the various modules of ESP 13 or externally.

Figure 1B:
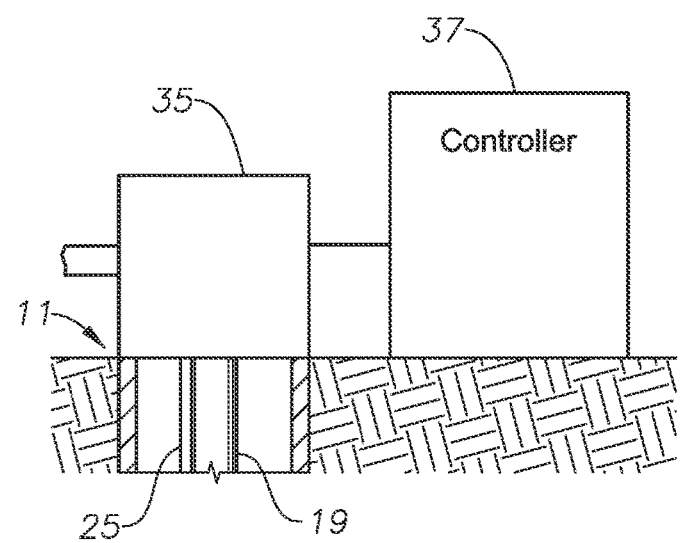
Figure 2:
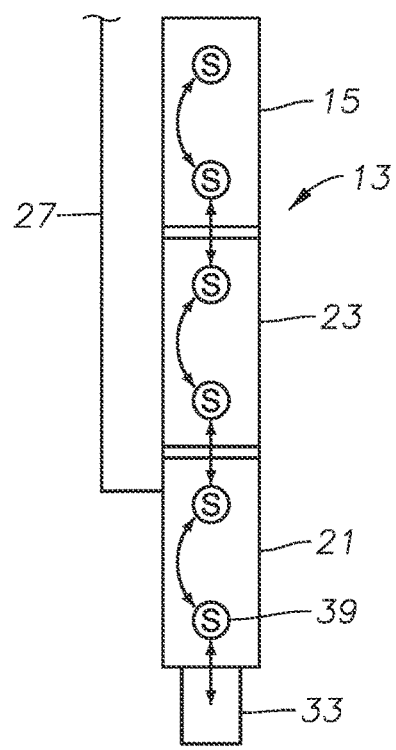
FIG. 2 is a schematic view of the ESP of FIG. 1A, and illustrating SAW sensors at the top and bottom of each of the shafts of the ESP.

The information provided by SAW sensors 39 on each of the ESP modules can be used for a variety of purposes by controller 37 (FIG. 1B). The information provided deals with system parameters, pump parameters, seal section parameters and motor parameters. For example, a change in torque monitored by the SAW sensors 39 in pump 15 could be determinative of gas locking or slugging of well fluid being pumped by pump 15. Controller 37 could take remedial action, such as slowing or stopping motor 21. An increase in torque and twist monitored by SAW sensors 39 on the pump shaft could be indicative of wear of the pump bearings.

An increase in torque and twist monitored by SAW sensors 39 on the seal section shaft could be indicative of thrust bearing wear. Information concerning the torque on the seal section shaft may be used to determine power consumption of seal section 23. If the pump shaft is stuck due to well fluid sand entry, the torque information provided to controller 37 may be used by controller 37 to apply selected amounts of torque to motor 21 without exceeding the yield strengths of the shafts. In addition to torque, SAW sensors 39 will also be able to monitor temperatures of the various shafts in ESP 13. If coupled with a downhole flow meter and differential pressure gauges, the efficiency of the pump can be determined.

Figure 3:
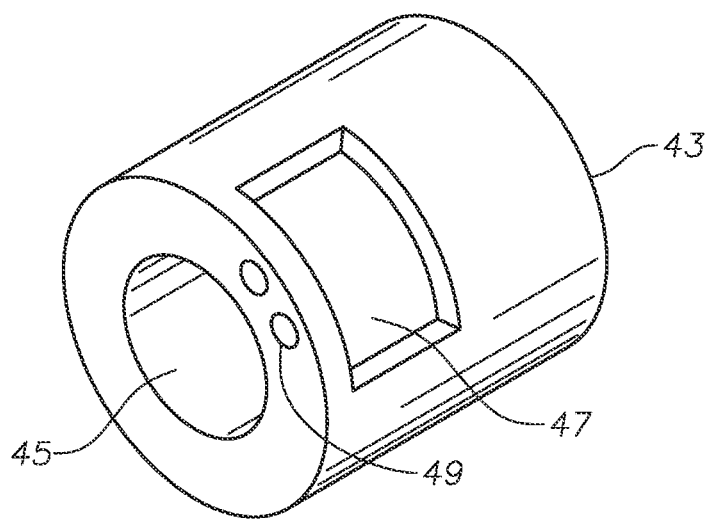
FIG. 3 is a schematic view of a tubular body containing a pocket for receiving a SAW electronic circuit for a SAW sensor.

Referring to FIG. 3, the electronic circuitry for each SAW sensor 39 is mounted to a tubular body 43 that has an axially extending bore 45. Tubular body 43 may be a base or head of the housing of pump 15, motor 21 and/or seal section 23. Or, tubular body 43 may be attached to the housing of pump 15, motor 21 and/or seal section 23. Further tubular body 43 could be mounted within the housings of pump 15, motor 21 and/or seal section 23.

A pocket 47 formed in the exterior of tubular body 43 will contain a SAW electronics circuit. One or more passages 49 extend axially through the side wall of tubular body 43 from pocket 47 to one end of tubular body 43 for containing signal wires or lines 41 (FIG. 1).

Figure 4:
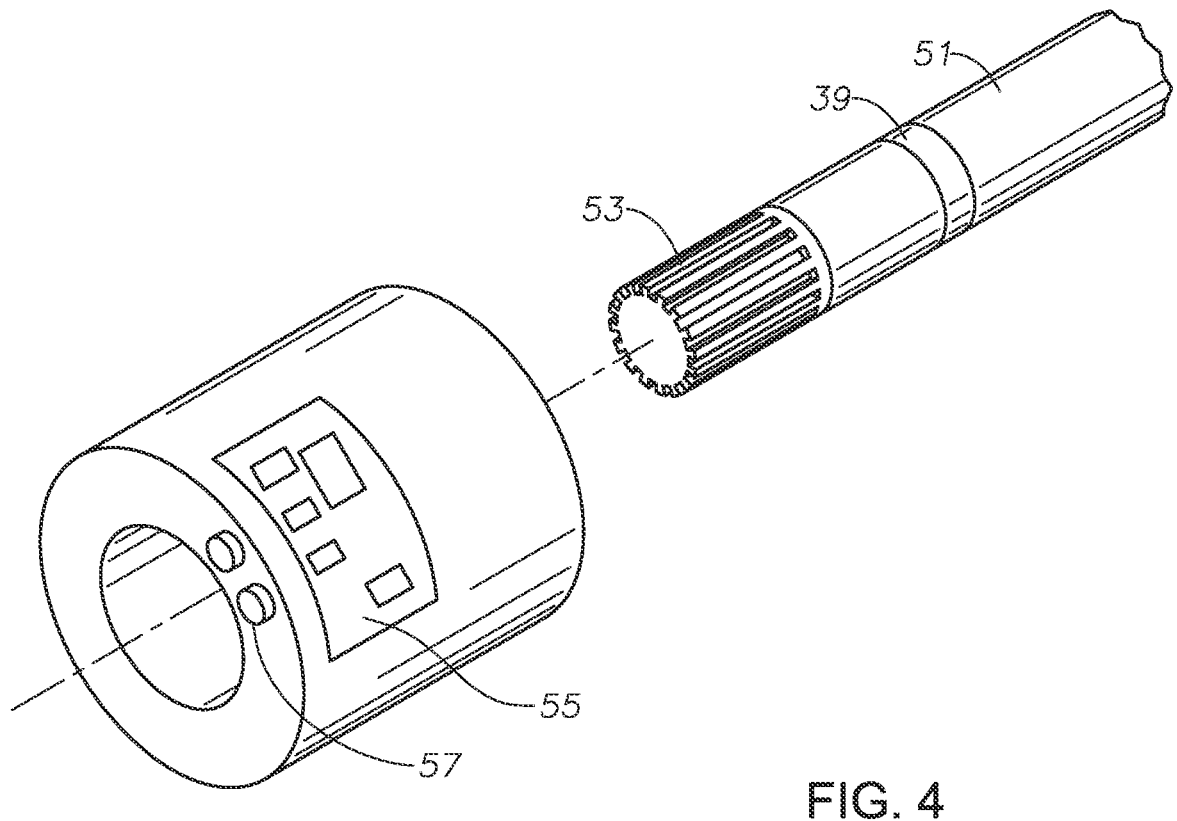
FIG. 4 is a schematic exploded view of a SAW sensor mounted on a shaft and a SAW electronic circuit mounted in the pocket of the tubular body of FIG. 3.

Referring to FIG. 4, a drive shaft 51 with a splined end 53 extends through bore 45. Shaft 51 may be either the pump shaft, motor shaft or seal section shaft. Splined end 53 may be at the upper or lower end of drive shaft 51, or both ends. One or more of the SAW sensors 39 attaches to shaft 51 adjacent one of the splined ends 53. SAW sensor 39 is a thin, flexible substrate that wraps at least partially around shaft 51 and may be secured by an adhesive.

A SAW electronics circuit 55 for each SAW sensor 39 fits within pocket 47. Saw electronics circuit 55 may also be flexible and secured within pocket 47 with an adhesive. Signal lines 41 (FIG. 1) have terminals or connectors 57 at the ends of the signal line passages 49 (FIG. 3). Connectors 57 join with signal lines 41 extending to other SAW electronics circuits 55 or to motor gauge unit 33 (FIG. 1). A cover plate 58 (FIG. 5) secures over pocket 47, sealing SAW electronics circuit 55 from liquids on the exterior, such as well fluid or motor lubricant.

SAW sensor 39 will be positioned on shaft 51 inside of tubular body bore 45 in radial alignment with and closely spaced to an antenna of SAW electronics circuit 55. SAW electronics circuit 55 sends an input signal to SAW sensor 39 and receives an output signal from SAW sensor 39. The signal passes through either well fluid or motor lubricant. SAW sensor 39 is passive, having no battery nor any wires connected to it.

Figure 5:
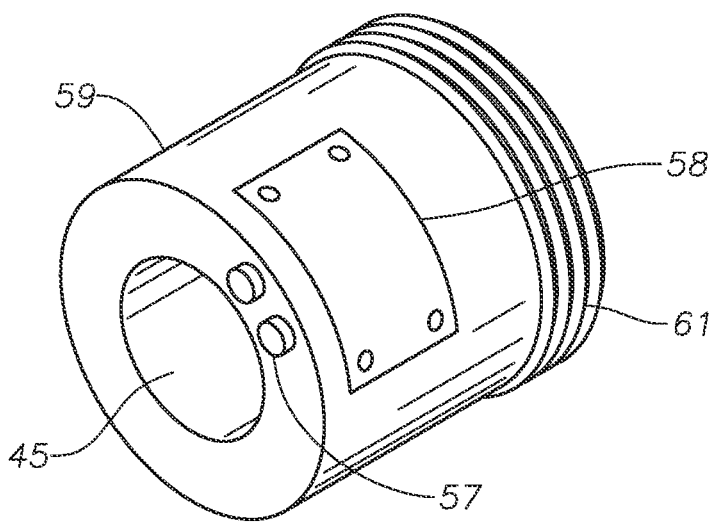
FIG. 5 is a schematic view of the SAW tubular body of FIG. 4 configured for mounting inside a head or base of one or more modules of the ESP of FIG. 1.

Tubular body 59 in FIG. 5 is the same as tubular body 43 (FIG. 3), except that it is configured to fit within either the base or head portion of the housing of pump 15, seal section 23 and/or motor 21. Tubular body 59 has external threads 61 for securing it within one of the base or head portions. SAW electronics circuit 55 (FIG. 4) will be mounted within pocket 47 (FIG. 3) of tubular body 59. FIGS. 8 and 9, discussed below, show more details of this mounting arrangement for SAW electronics circuit 55.

Figure 6:
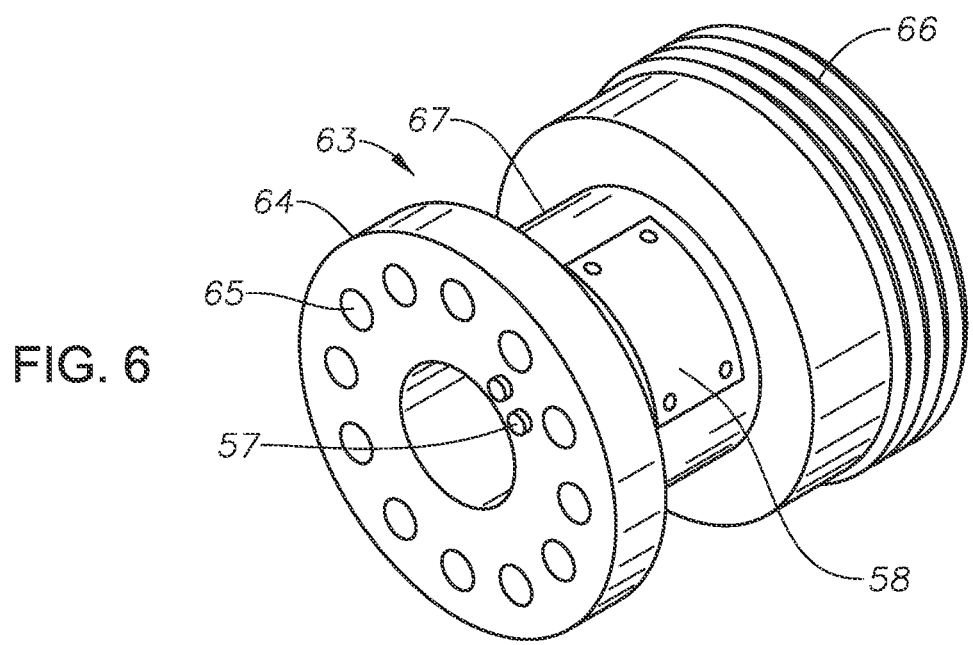
FIG. 6 is a schematic view of the SAW tubular body of FIG. 4 configured to be a base or a head of one or more modules of the ESP of FIG. 1.
Figure 10:
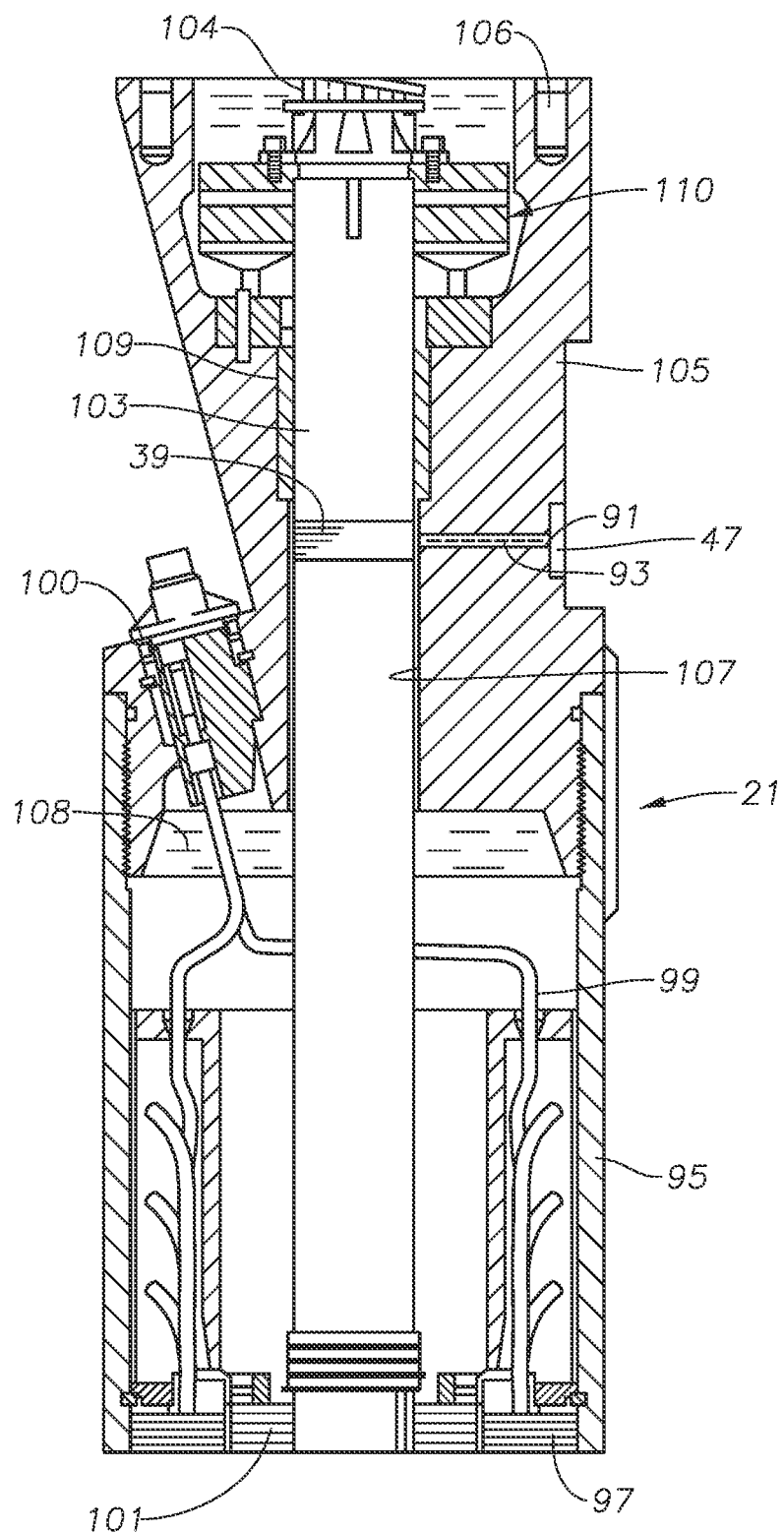
FIG. 10 is a sectional and partly schematic view of the tubular body of FIG. 4 serving also as the head of the motor of FIG. 1.

Tubular body 63 in FIG. 6 is the same as tubular body 43, except it will also serve as an integral component of the housings of pump 15, seal section 23 and/or motor 21. Tubular body 63 is illustrated as a base or head portion of one of the housings. Tubular body 63 may have an external flange 64 with bolt holes 65 for bolting to the housing of pump 15, seal section 23 and/or motor 21. Another end of tubular body 63 may have external threads 66 for connecting to internal threads of the housing of the pump 15, seal section 23, and/or motor 21. A reduced diameter neck 67 extends between bolt hole flange 63 and the portion containing external threads 66. Alternatively to bolts, a rotatable threaded sleeve or spinner may be employed as a connector between modules of ESP 13. Pocket 47 (FIG. 3) for SAW electronics circuit 55 (FIG. 4) will be located on neck 67. FIG. 10, discussed below, shows more details of this mounting arrangement for SAW electronics circuit 55.

Figure 7:
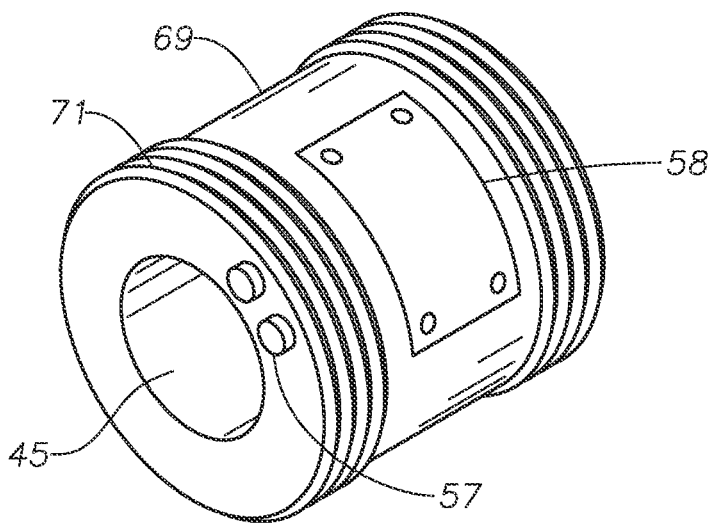
FIG. 7 is a schematic view of the SAW tubular body of FIG. 4 configured to be secured to an end of a base or head of one or more modules of the ESP of FIG. 1.

In FIG. 7, tubular body 69 is the same as tubular body 43 (FIG. 3) except it has two sets of external threads 71. One set of external threads 71 will connect to the base or head of the housing of pump 15, seal section 23 and/or motor 21. The other set of external threads 71 will connect to the base or head of the housing of pump 15, seal section 23 and/or motor 21. Tubular body 69 thus is an adapter connector that connects to the base or head of the housing of pump 15, seal section 23 and/or motor 21. Tubular body 69 also has a pocket 47 (FIG. 3) for holding SAW electronics circuit 55 (FIG. 4). More specifically, tubular body 69 could be secured as an upper adapter connector connected between pump 15 and seal section 23 and also as a lower adapter connector connected between seal section 23 and motor 21. As an upper adapter connector, the lower end of tubular body 69 would connect to a head of seal section 23 (FIG. 1) and the upper end to a base of pump 15. As a lower adapter connector, the upper end of tubular body 69 would connect to a base of seal section 23 and the lower end to a head of motor 21. In each instance, SAW electronics circuit 55 (FIG. 4) would be in pocket 47 (FIG. 3) formed on the adapter connector. Other arrangements for mounting tubular body 69 to the modules of ESP 13 (FIG. 1) are feasible.

Referring to FIG. 8, pump 15 has a housing 73, which is a cylindrical outer sleeve containing a large number of pump stages (only two shown). Each pump stage includes a non-rotating diffuser 75 and an impeller 77. A pump shaft 79 extends axially through housing 73 and is supported radially by bearings 81 (only one shown). In this example, pump 15 has a pump base 83 that has external threads on its upper end that secure to internal threads in the lower end of pump housing 73. Pump base 83 may be considered to be an integral part of pump housing 73. Pump base 83 has an external flange 85 on its lower end for bolting to another module of ESP 13, such as an upper end of seal section 23. The reduced diameter neck portion between its upper end and flange 85 has openings that serve as well fluid intake 17.

Pump drive shaft 79 has a lower externally splined end 87. A coupling 89 with internal splines engages splined end 87 to connect pump drive shaft 79 with an upper splined end (not shown) of another of the ESP modules, which would be seal section 23 in this example.

Tubular body 59 of FIG. 5 is installed in bore 90 of pump base 83. External threads 61 of tubular body 59 engage internal threads formed in bore 90 of pump base 83. Referring also to FIG. 9, tubular body 59 has an antenna passage 91 extending radially inward from pocket 47 to tubular body bore 45. SAW electronics circuit 55 is sealed within pocket 47 and has an antenna 93 extending into antenna passage 91. The inner end of antenna passage 91 extends to bore 45 but may be sealed by a plug or seal 94 to prevent the entry of well fluid into antenna passage 91 and pocket 47. Plug 94 is of a material that allows the transmission of input and output signals from and to SAW electronics circuit 55.

SAW sensor 39 is bonded around pump shaft 79 directly inward from antenna 93. A radial line from the axis of pump shaft 79 is normal to SAW sensor 39 and passes through antenna passage 91 once per revolution of pump shaft 79. The gap between tubular body bore 45 and SAW sensor 39 is quite small, such as between 0.050 and 0.100 inch. This gap will contain well fluid, thus the input and output signals must pass through the well fluid. Intake ports 17 are located axially between tubular body 59 and the pump stages 75, 77. The flow of well fluid entering intake ports 17 will not have to pass through the annular clearance between tubular body bore 45 and SAW sensor 39, thus the well fluid in this annular clearance may be relatively stagnant.

Another tubular body 59 may also be installed in the same manner as in FIG. 8 within the upper end or head of pump 15. Also, tubular body 59 may be installed in the same manner as in FIG. 8 within the base or head bores of seal section 23 and motor 21.

FIG. 10 schematically illustrates one embodiment of an upper portion of motor 21. Motor 21 has a motor housing 95, which is a cylindrical outer shell. A stator 97 that may be conventional mounts in motor housing. Stator 97 is non-rotatable relative to motor housing 95. Stator 97 comprises a stack of steel disks or laminations with slots through which motor windings 99 are wound. For a three-phase motor, there are three sets of motor windings 99. Each set of motor windings 99 has an upper lead portion that connects to an electrical connector 100 for connection with motor lead electrical connector 31 (FIG. 1). Motor 21 has a rotor 101 extending axially through a bore of stator 97. Rotor 101 may also be conventional, such as having copper rods extending through a stack of discs or permanent magnets in place of the copper rods.

Rotor 101 mounts to and causes motor shaft 103 to rotate in response to the electromagnetic field of stator 97. Motor shaft 103 has a splined upper end 104 for connection to the next upper ESP module, which in this example is seal section 23 (FIG. 1).

Motor shaft 103 extends through a motor head 105 secured on its lower end by external threads to internal threads in motor housing 95. Motor head 105 may be considered to be a part of motor housing 95. The upper end of motor head 105 has bolt holes 106 for connection to the base of seal section 23. Motor head 105 has a bore 107 through which motor shaft 103 extends. Radial bearings 109 (only one shown) in bore 107 provide radial stability to motor shaft 103. Motor 21 is filled with a dielectric motor lubricant 108, which communicates the interior of seal section 23 (FIG. 1) with the interior of motor 21. The lubricant 108 in the bore of stator 97 communicates with the interior of seal section 23 (FIG. 1) through bearings 109 and the annular clearance between motor shaft 103 and bore 107. A motor thrust bearing assembly 110 may be adjacent shaft upper threaded end 104 for transferring down thrust on motor shaft 103 to an upward facing portion of motor head 105.

In this example, tubular body 69 of FIG. 6 comprises motor head 105. Pocket 47 formed on the exterior of head 105 contains one of the SAW electronics circuits 55. Pocket 47 has a radially extending passage 91 leading to bore 107. Passage 91 contains a SAW antenna 93 extending from SAW electronics circuit 55. The inner end of antenna passage 91 may be plugged to prevent the entry of motor lubricant to pocket 47. The material of the plug is selected to allow input and output signals from antenna 93 to and from SAW sensor 39. SAW sensor 39 is adhered to motor shaft 103 in radial alignment with antenna passage 91. The radial distance or gap from bore 107 to SAW sensor 39 is small, such as 0.050 to 0.100 inch. In this example, SAW sensor 39 is located inboard from bearings 109, but other arrangements are feasible. Signals between SAW sensor 39 and SAW electronics circuit 55 pass through motor lubricant 108.

Similar arrangements to FIG. 10 could be employed for the base of motor 21 as well as the bases and heads of pump 15 and seal section 23 (FIG. 1). Placing the SAW electronics circuit 55 in pockets 47 formed in the heads and bases of seal section 23 and pump 21 could be done in a similar manner to FIG. 10.

The present disclose described herein, therefore, is well adapted to carry out the objects and attain the ends and advantages mentioned, as well as others inherent therein. While a few embodiments of the invention have been given for purposes of disclosure, numerous changes exist in the details for accomplishing the desired results. These and other similar modifications will readily suggest themselves to those skilled in the art, and are intended to be encompassed within the appended claims.

The invention claimed is:

1. An electrical submersible pump assembly for pumping well fluid from a well, comprising:
   a pump having a pump housing containing a plurality of pump stages through which a pump shaft extends;
   a motor having a motor housing containing a motor shaft;
   a seal section having a seal housing containing a seal shaft that is coupled to and between the pump shaft and the motor shaft;
   a motor shaft surface SAW (acoustic wave) sensor on the motor shaft;
   a motor shaft SAW electronic circuit mounted to the motor housing, the motor shaft SAW electronic circuit having a motor shaft SAW antenna closely spaced to the motor shaft SAW sensor for monitoring torque on the motor shaft;
   a controller adapted to be mounted at an upper end of the well for supplying power to the motor;
   a motor gauge unit mounted to a lower end of the motor for transmitting signals to the controller; and
   a signal line extending from the motor shaft SAW electronic circuit to the motor gauge unit for transmitting signals from the SAW electronic circuit to the motor gauge unit, and from the motor gauge unit to the controller.

2. The assembly according to claim 1, wherein:
   the motor shaft SAW sensor is located adjacent an upper end of the motor shaft.

3. The assembly according to claim 1, further comprising:
   a pump SAW sensor on the pump shaft;
   a pump SAW electronic circuit on the pump housing and having a pump shaft SAW antenna closely spaced to the pump SAW sensor; wherein:

the pump SAW electronic circuit is in electrical communication with the motor gauge unit via the signal line for transmitting signals from the pump SAW electronic circuit to the controller.

4. The assembly according to claim 3, further comprising:
a seal section SAW sensor on the seal shaft;
a seal section SAW electronic circuit on the seal section housing and having a seal shaft antenna closely spaced to the seal section SAW sensor; wherein:
the seal section SAW electronic circuit is in electrical communication with the motor gauge unit via the signal line for transmitting signals from the seal section SAW electronic circuit to the controller.

5. The assembly according to claim 1, wherein the motor is filled with a dielectric lubricant, and signals between the motor shaft SAW sensor and the motor shaft SAW electronic circuit pass through the dielectric lubricant.

6. The assembly according to claim 3, wherein signals between the pump shaft SAW sensor and the pump shaft SAW electronic circuit pass through well fluid being pumped by the pump.

7. The assembly according to claim 3, further comprising:
a pump tubular body secured within the pump housing; and wherein
the pump SAW electronics circuit is mounted to the tubular body.

8. The assembly according to claim 7, further comprising:
a pocket formed in an outer side wall of the pump tubular body that contains the pump SAW electronics circuit;
an antenna passage extending from the pocket to an inner side wall of the pump tubular body; and wherein
the pump shaft SAW antenna is located in the antenna passage.

9. The assembly according to claim 1, further comprising:
a motor tubular body that forms a part of the motor housing;
the motor SAW electronics circuit is mounted in a pocket formed in an outer side wall of the motor tubular body;
an antenna passage extends from the pocket to an inner side wall of the motor tubular body; and
the motor shaft SAW antenna is mounted in the antenna passage adjacent the inner side wall of the motor tubular body and is electrically connected with the motor SAW electronics circuit.

10. The assembly according to claim 9, wherein:
the motor housing comprises a cylindrical outer sleeve having a motor head at an upper end of the outer sleeve; and
the motor tubular body has a lower end secured to the motor head and an upper end secured to the seal section.

11. The assembly according to claim 9, wherein:
the motor housing comprises a cylindrical outer sleeve having a motor head at an upper end of the outer sleeve; and
the motor tubular body comprises the motor head.

12. An electrical submersible pump assembly for pumping well fluid from a well, comprising:
a pump having a pump housing containing a plurality of pump stages through which a pump shaft extends;
a motor having a motor housing and a motor shaft extending through the motor housing;
a motor shaft SAW (surface acoustic wave) sensor mounted on the motor shaft adjacent an upper end of the motor shaft for monitoring torque on the motor shaft;

a tubular body on an upper end of and forming part of the motor housing, the tubular body having a bore;
a dielectric motor lubricant in the motor and within the bore of the tubular body;
a pocket formed in an outer side wall of the tubular body;
an antenna passage extending from the pocket to the bore;
a motor shaft SAW electronic circuit within the pocket;
an antenna located within the antenna passage adjacent the motor shaft SAW sensor and electrically connected with the motor shaft SAW electronic circuit; and
wherein the SAW electronic circuit transmits and receives signals from the SAW sensor through the motor lubricant via the antenna.

13. The assembly according to claim 12, further comprising:
a seal section coupled between the pump and the motor; wherein:
the motor housing comprises a cylindrical outer sleeve and a head secured to the outer sleeve; and
the tubular body comprises an adapter connector having a lower end secured to the head and an upper end secured to the seal section.

14. The assembly according to claim 12, wherein the tubular body is secured inside the motor housing.

15. An electrical submersible pump assembly for pumping well fluid from a well, comprising:
a pump having a pump housing containing a plurality of pump stages and a pump base at a lower end of the pump housing;
a pump shaft extending through the pump housing;
a pump shaft SAW (surface acoustic wave) sensor mounted on the pump shaft within the pump base for monitoring torque being used by the pump shaft;
a pump shaft SAW electronic circuit mounted to the pump base for providing signals to and receiving signals from the pump shaft SAW sensor indicative of torque being used by the pump;
a motor having a motor housing and a motor head at an upper end of the motor housing;
a motor shaft extending through the motor housing;
a seal section that is coupled to and between the pump base and the motor head;
a motor shaft SAW sensor on an upper portion of the motor shaft; and
a motor shaft SAW electronic circuit mounted to the motor head for providing signals to and receiving signals from the motor SAW sensor for providing signals indicative of torque being generated by the motor.

16. The assembly according to claim 15, further comprising:
a controller adapted to be mounted at an upper end of the well for supplying power to the motor;
a motor gauge unit mounted to a lower end of the motor for transmitting signals to the controller; and
a signal line extending from the pump shaft SAW electronic circuit and the motor shaft SAW electronic circuit to the motor gauge unit for transmitting signals from the pump shaft SAW electronic circuit and the motor shaft SAW electronic circuit to the motor gauge unit, and from the motor gauge unit to the controller.

17. The assembly according to claim 15, wherein signals between the pump shaft SAW electronics circuit and the pump shaft SAW sensor pass through well fluid being pumped by the pump.

18. The assembly according to claim 15, wherein signals between the motor shaft SAW electronics circuit and the motor shaft SAW sensor pass through dielectric lubricant contained in the motor.

19. The assembly according to claim 15, further comprising:
- a motor head pocket formed in an outer side wall of the motor head that contains the motor shaft SAW electronic circuit;
- a motor head antenna passage extending from the motor head pocket to a bore of the motor head;
- a motor head antenna located within the motor head antenna passage adjacent the motor shaft SAW sensor and electrically connected with the motor shaft SAW electronic circuit;
- a pump base pocket formed in an outer side wall of the pump base that contains the pump shaft SAW electronic circuit;
- a pump base antenna passage extending from the pump base pocket to a bore of the pump base; and
- a pump base antenna located within the pump base antenna passage adjacent the pump shaft SAW sensor and electrically connected with the pump shaft SAW electronic circuit.

* * * * *